(12) United States Patent
Miyamoto et al.

(10) Patent No.: US 6,327,046 B1
(45) Date of Patent: Dec. 4, 2001

(54) ELECTRONIC MAIL PROCESSING APPARATUS AND METHOD THEREFOR

(75) Inventors: Satoru Miyamoto, Tenri; Toshitaka Kaneda, Kashihara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/103,614

(22) Filed: Jun. 24, 1998

(30) Foreign Application Priority Data

Aug. 29, 1997 (JP) .................................................... 9-233624

(51) Int. Cl.[7] .................................................... G06F 15/16
(52) U.S. Cl. ......................... 358/1.15; 709/206; 709/213
(58) Field of Search ................................ 358/1.15, 402, 358/403, 407, 442, 434, 438; 709/204, 206, 207, 213, 214, 203, 216, 218, 219, 217; 345/804, 805, 809

(56) References Cited

U.S. PATENT DOCUMENTS

| | | | | |
|---|---|---|---|---|
| 5,165,012 | * | 11/1992 | Crandall et al. ...................... | 345/809 |
| 5,734,837 | * | 3/1998 | Flores et al. .............................. | 705/7 |
| 5,764,899 | * | 6/1998 | Eggleston et al. .................... | 709/203 |
| 5,813,007 | * | 9/1998 | Nielsen .................................. | 707/10 |
| 5,826,022 | * | 10/1998 | Nielsen ................................. | 709/206 |
| 5,835,758 | * | 11/1998 | Nochur et al. ........................ | 707/102 |
| 5,905,495 | * | 7/1999 | Tanaka et al. ......................... | 345/335 |
| 5,923,848 | * | 7/1999 | Goodhand et al. ................... | 709/219 |
| 5,930,471 | * | 7/1999 | Milewski et al. ..................... | 709/204 |
| 6,016,478 | * | 1/2000 | Zhang et al. ............................ | 705/9 |

FOREIGN PATENT DOCUMENTS 7-202934    8/1995   (JP) .

* cited by examiner

Primary Examiner—Edward Coles
Assistant Examiner—Joseph R. Pokrzywa
(74) Attorney, Agent, or Firm—Nixon and Vanderhye P.C.

(57) ABSTRACT

An electronic mail processing apparatus includes: a transmitting device for transmitting electronic mails; a receiving device for receiving electronic mails; a selecting device for selecting whether a request for reply to an electronic mail to be transmitted is to be made or not; a reply due date inputting device for inputting a due date of reply when a selection has been made by the selecting device to make the request for reply; a registering device for automatically registering in a memory a predetermined information including an information on presence/absence of the reply to the transmitted mail and the due date of reply; and a displaying device for displaying at least the information on presence/absence of the reply and the due date of reply for each transmitted mail.

6 Claims, 17 Drawing Sheets

FIG.4

| ADDRESS | TITLE (DATE AND TIME OF TRANSMISSION) | REPLY DUE DATE | RETRANSMISSION TIME INTERVAL | RETRANSMISSION CONDITION FLAG | NUMBER OF PROMPTING TIMES |
|---|---|---|---|---|---|
| ABC@DEF.GHIJK.CO.JP | CONFERENCE TO BE HELD ON APRIL 2 ABOUT PLANNING (1997/3/26 10:50) | 1997/04/01 | 3 | 1 | 1 |
| XYZ@OPQ.GHIJK.CO.JP | INQUIRY (1997/3/28 15:30) | 1997/05/06 | NULL | 1 | 1 |
| | | | | | |
| | | | | | |
| | | | | | |
| | | | | | |
| | | | | | |

FIG.5

PRESENT DATE AND TIME
MARCH 26,1997 10:40

ELECTRONIC MAIL

21 — TRANSMIT
22 — CANCEL

CONNECTION DESTINATION: _____ 16
ADDRESS: abc@def.ghijk.co.jp — 17
TITLE: CONFERENCE TO BE HELD ON APRIL 2 ABOUT PLANNING — 18

CHECK BOX 19 — ☑ REGISTER REPLY MAIL TO "TO DO ITEM"

CONTENT: PLEASE REPLY TO US WHETHER YOU WILL ATTEND THE CONFERENCE TO BE HELD ON APRIL 2 ABOUT PLANNING.

FIG.6

SETTING PROHIBITION AREA — 23

PREVIOUS MONTH — 25

MARCH 1997

| SAN. | MON. | TUE. | WED. | THU. | FRI. | SAT. |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | [26] | 27 | 28 | 29 |
| 30 | 31 |  |  |  |  |  |

PRESENT DAY

REPLY DUE DATE — NEXT MONTH — 26

APRIL 1997

| SAN. | MON. | TUE. | WED. | THU. | FRI. | SAT. |
|---|---|---|---|---|---|---|
|  |  | [1] | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 |  |  |  |

WHEN IS THE REPLY DUE?

REPLY DUE DATE: [1997] YEAR [4] MONTH [1] DAY — 24

[TRANSMIT] — 27    [CANCEL] — 28    [AUTOMATIC RETRANSMISSION SETTING] — 29

FIG.7

TO DO LIST (UNFINISHED) 30   AUTOMATICALLY CREATED ITEM 31

| CHECK BOX | SCHEDULED DAY OF FINISHING THE TASK | TITLE |
|---|---|---|
| ☐ | 1997/04/01 | CONFERENCE TO BE HELD ON APRIL 2 ABOUT PLANNING |
| ☐ | 1997/05/10 | SUBMISSION OF SEARCH REPORT |
| ☐ | 1997/04/25 | PREPARATION OF REFERENCE MATERIALS FOR MEETING |
| ☐ | 1997/05/06 | INQUIRY |
| ☐ | 1997/04/05 | SUBMISSION OF TASK |

FIG.8

TO DO LIST (FINISHED)

ITEM AUTOMATICALLY CHECKED AS A FINISHED TASK

| CHECK BOX | FINISHING DATE | TITLE |
|---|---|---|
| ✓ | 1997/03/28 | CONFERENCE TO BE HELD ON APRIL 2 ABOUT PLANNING |
| ✓ | 1997/04/01 | SUBMISSION OF TASK |
| ✓ | 1997/03/29 | PURCHASE OF MACHINE |

32

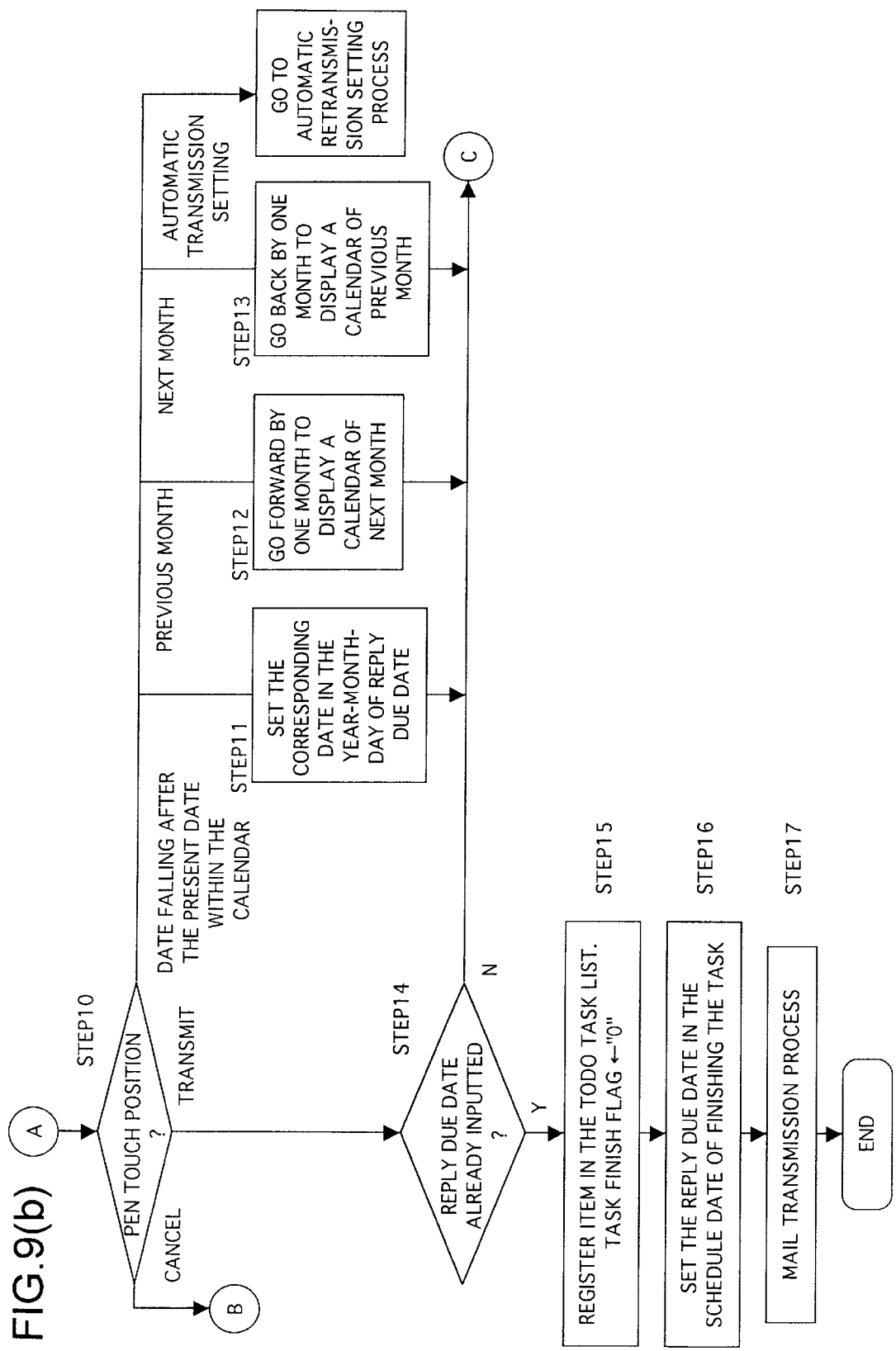

FIG.11

ELECTRONIC MAIL AUTOMATIC
RETRANSMISSION SETTING                                           MARCH 26,1997  10:41

RADIO BUTTON

33 — AUTOMATIC
     RETRANSMISSION :   ● YES    ○ NO

34 — DUE DATE : APRIL 1,1997

35 — RETRANSMISSION : RETRANSMISSION WILL BE CARRIED OUT
     TIME INTERVAL   EVERY [ 3 ↔ ] DAYS.
                            36

☑  ONLY THE LATEST PROMPTING MAIL WILL BE
        RETRANSMITTED WHEN CONNECTION IS MADE
     37 CHECK BOX

[ SET ]    [ CANCEL ]
               38         39

FIG.12

ELECTRONIC MAIL AUTOMATIC
RETRANSMISSION SETTING

MARCH 26,1997 10:42

AUTOMATIC
RETRANSMISSION : ● YES   ○ NO

DUE DATE : APRIL 1,1997

RETRANSMISSION : RETRANSMISSION WILL BE CARRIED OUT EVERY
TIME INTERVAL

← [  ] →
1
2
[3]
4
5
⎬ LIST BOX

DAYS.

[ SET ]   [ CANCEL ]

ELECTRONIC MAIL PROCESSING APPARATUS AND METHOD THEREFOR

CROSS-REFERENCES TO RELATED APPLICATION

This application is related to Japanese Patent Application No. HEI 09(1997)-233624, filed on Aug. 29, 1997, whose priority is claimed under 35 USC §119, the disclosure of which is incorporated herein by reference in its entirety.

BACKGROUND OF THE INVENTION

1. Field of the Invention

The present invention relates to an electronic mail processing apparatus and a method therefor, and more particularly it relates to an electronic mail processing apparatus having a function of transmitting and receiving electronic mails and a function of managing the memorandum record, for example, an apparatus such as a portable information apparatus, a word processor, or a work station.

2. Description of the Related Arts

Recently, communication is often conducted through exchanging electronic mails, and requests or orders are sometimes made by means of electronic mails. However, since electronic mails do not remain as a solid substance unless they are printed on a sheet of paper, there often arises a problem that a receiver of request by an electronic mail often forgets to send a reply to the request unless the receiver securely manages a schedule.

As a means for solving this problem, Japanese Unexamined Patent publication No. HEI 07(1995)-202934 discloses a technique in which electronic mails having a due date for reply are managed by a mail server to automatically transmit a prompting mail. This technique involves automatically transmitting a prompting mail on a day designated by a dav designation means, where the promoting mail prompts the receiver to send a reply to an already transmitted mail. This enables automatic follow-up of mails, whereby smooth transmission of replies to the mails is facilitated.

However, according to the above technique, a system for processing the mails having a due date for reply must be provided in the mail server, so that an already existing mail server must be enlarged. This causes a great problem in recent years when mails are exchanged through an Internet connecting provider.

Recently, electronic management of schedules is often conducted by means of a memorandum record or a Todo task list. However, the Todo task list is not linked with electronic mails, so that the user must input the due date of the mail into the Todo task list by self management.

Moreover, although it is possible to report the existence of an electronic mail to which a reply has not yet been made, it is not possible to manage the day on which the reply is received. Also, as in the case of personal computer communication, if connection is not always maintained and the connection time interval is longer than the time interval of transmitting prompting mails, there arises a problem that a plurality of prompting mails are simultaneously transmitted to the same receiver.

SUMMARY OF THE INVENTION

The present invention provides an electronic mail processing apparatus comprising: a transmitting device for transmitting electronic mails; a receiving device for receiving electronic mails; a selecting part for selecting whether a request for reply to an electronic mail to be transmitted is to be made or not; an inputting device for inputting a due date of reply when a selection has been made by the selecting part to make the request for reply; a registering part for automatically registering in a memory a predetermined information including an information on presence/absence of the reply to the transmitted mail and the due date of reply; and displaying device for displaying at least the information on presence/absence of the reply and the due date of reply for each transmitted mail.

BRIEF DESCRIPTION OF THE DRAWINGS

The present invention will be better understood from the following detailed description of preferred embodiments of the invention, taken in conjunction with the accompanying drawings, in which:

FIG. 4 is a view showing an example of a memory table for retransmission setting according to the present invention;

FIG. 5 is a view illustrating an example of a screen for transmitting an electronic mail according to the present invention;

FIG. 6 is a view illustrating an example of a screen for setting a due date of reply according to the present invention;

FIG. 7 is a view illustrating an example of a screen displaying a list of unprocessed Todo items according to the present invention;

FIG. 8 is a view illustrating an example of a screen displaying a list of finished Todo items according to the present invention;

FIG. 11 is a view illustrating an example of a screen for automatic retransmission setting according to the present invention;

FIG. 12 is a view illustrating an example of a screen for retransmission time interval setting according to the present invention;

DETAILED DESCRIPTION OF THE PREFERRED EMBODIMENTS

Figure 1:
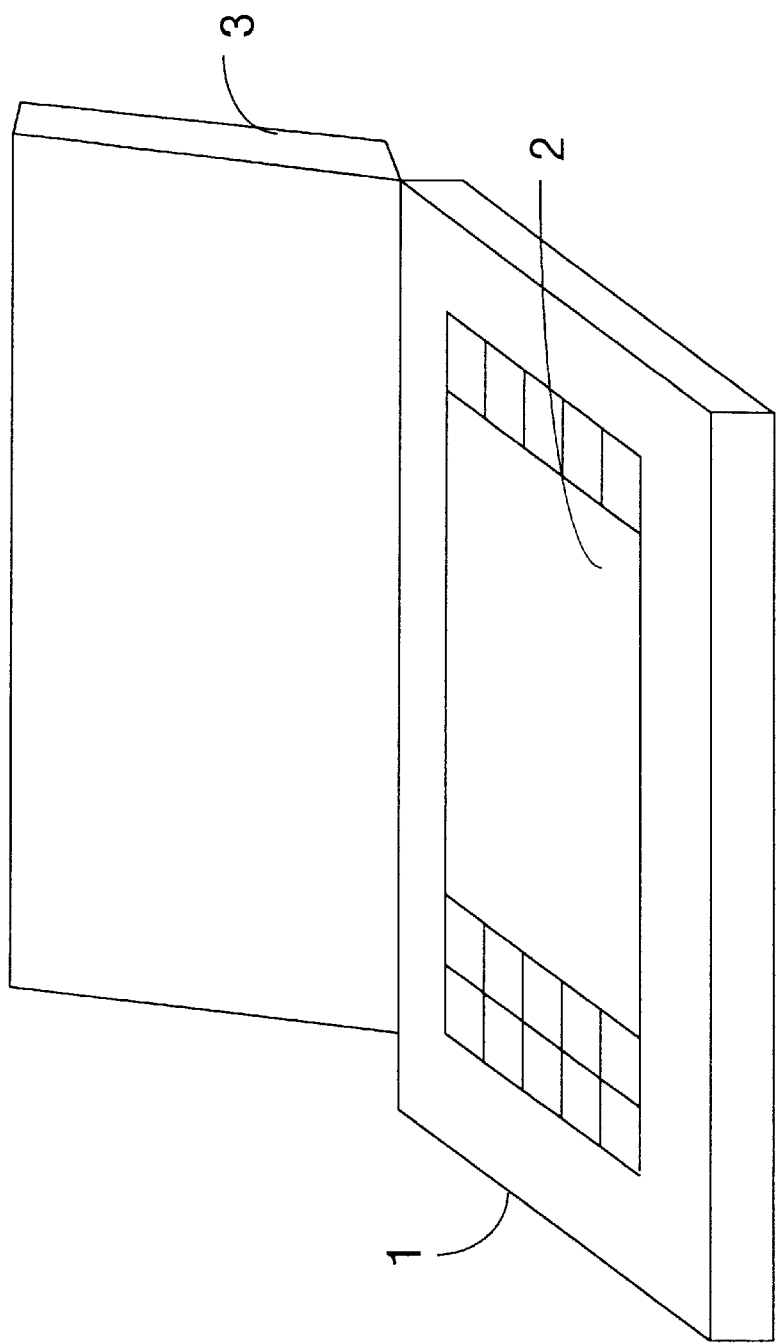
FIG. 1 is a perspective view of an outlook of an embodiment according to the present invention.

The present invention also provides an electronic mail processing apparatus further comprising reply determining means for determining whether or not a first electronic mail received by the receiving device is a reply to a second electronic mail transmitted by the transmitting device on the basis of a predetermined information included commonly in the first and second electronic mails, wherein the registering part registers the presence of a reply as the information on presence/absence of reply when the reply determining means determines that the first electronic mail is a reply to the second electronic mail, and the displaying device displays the registered information on presence/absence of reply and displays the date of receiving the first electronic mail.

Also, the present invention provides an electronic mail processing apparatus further comprising prompting mail setting means for setting a time interval of transmitting prompting mails for prompting a reply, prompting determining means for determining whether the prompting mails should be transmitted or not on the basis of a predetermined condition, and prompting mail preparing means for preparing the prompting mails if it is determined that the prompting mails should be transmitted, whereby the transmitting device transmits the prepared prompting mails at the predetermined time interval set by the prompting mail setting means.

Here, the prompting determining means may determine that a prompting mail is to be transmitted if the present date is prior to the due date of reply and after the set time interval of transmission has passed from the date on which the electronic mail is transmitted and if a reply to the electronic mail has not been received yet. The reply determining means, the prompting mail setting means, prompting determining means, and the prompting mail preparing means are realized by microcomputer system which has CPU, ROM, RAM, timer and control programs.

Further, the present invention provides a method for processing electronic mails in an electronic mail processing apparatus having a function of transmitting and receiving the electronic mails, comprising the steps of: selecting whether a request for reply to an electronic mail to be transmitted is to be made or not at the time of transmitting the electronic mail; requesting an input of a due date of reply when a selection has been made in the selecting step to make the request for reply; and registering automatically in a memory a transmitted mail information including the due date of reply, an information on presence/absence of the reply, an address, a title, and the date and time of transmission for each transmitted mail.

Also, the present invention provides a method for processing electronic mails further comprising the steps of: determining whether a received electronic mail is a reply to the transmitted electronic mail or not by comparing a predetermined information in the received electronic mail and the automatically-registered transmitted mail information at the time of receiving the electronic mail; and registering a receiving date of the received electronic mail as a processing date and setting the presence of a reply as the information on presence/absence of reply when it is determined that the received electronic mail is a reply to the transmitted electronic mail.

Further, the present invention provides a method of processing electronic mails further comprising the steps of: selecting whether prompting mails are to be transmitted or not; setting a time interval of transmitting the prompting mails; determining whether the prompting mails should be transmitted or not for a transmitted mail to which a reply has not been sent yet as determined from the information on presence/absence of reply in the transmitted mail information; preparing the prompting mails for the transmitted mail for which it is determined that the prompting mails should be transmitted; and transmitting the prepared prompting mails at the set time interval for transmission.

Also, the present invention provides a computer readable recording medium containing an electronic mail processing program for performing the functions in the above-mentioned steps.

EMBODIMENTS

Embodiments of the present invention are now described with reference to the attached drawings. However, the present invention is not limited by these embodiments.

FIG. 1 is a perspective view of an outlook showing an embodiment of the present invention, in which the reference numeral 1 represents a main body cabinet section having an input/output section 2, an infrared communication section, a pen holding section (not shown), and the like. The main body cabinet section incorporates therein the input/output section having a displaying section and a transparent tablet which are integrally formed, and a power supply and the like for supplying an electric power to particular locations such as a control circuit. The input/output section 2 is explained later in detail with reference to FIG. 2.

Referring to FIG. 1, a lid 3 is hinged to the rear of the cabinet section 1 of a main body and rotates to cover an input/output section 2 to protect the input/output section 2 in carrying the main body.

Figure 2:
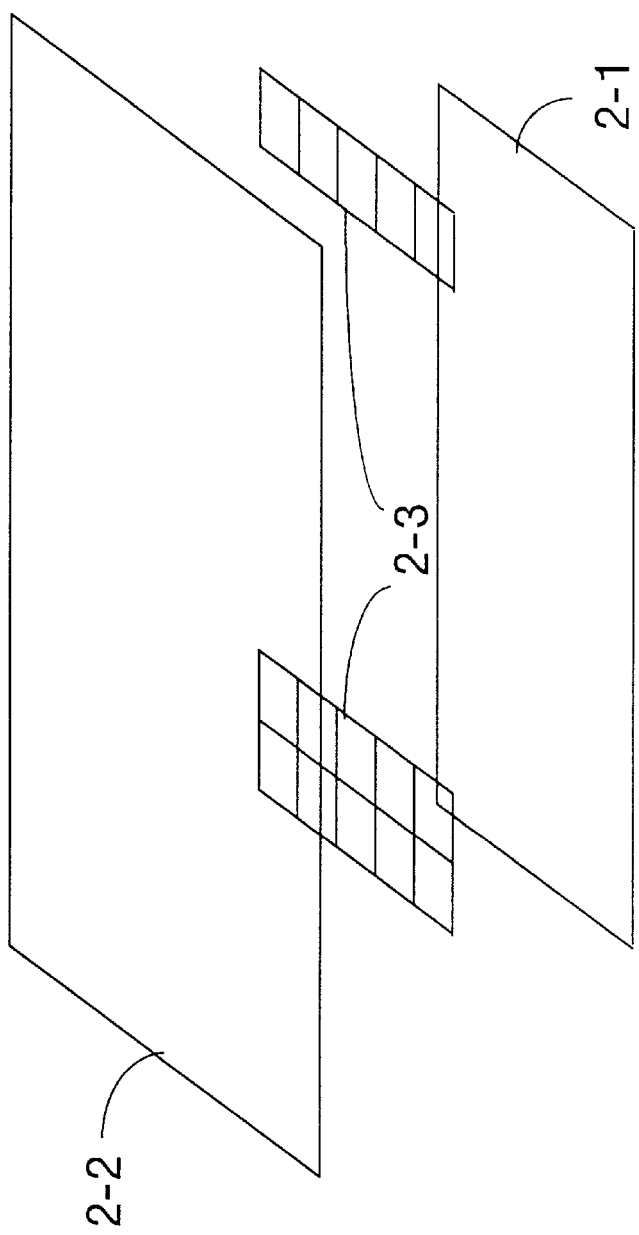
FIG. 2 is an exploded view illustrating a construction of a liquid crystal display section according to the present invention.

FIG. 2 is an exploded perspective view of the input/output section 2 in FIG. 1, in which the reference numeral 2-1 represents a thin liquid crystal displaying section of a matrix type capable of displaying letters and characters. The liquid crystal displaying section 2-1 can have an improved visibility by further providing in the rear surface a backlight including an EL panel or the like in accordance with the needs.

Referring to FIG. 2, a transparent tablet 2-2 has a dimension capable of covering the liquid crystal displaying section 2-1. In the transparent tablet 2-2, transparent electrodes are for example disposed on the inner surfaces of two transparent sheets, and small projecting spacers are printed regularly so that the electrodes may not touch with each other in an ordinary condition. By indicating and pressing the transparent sheet with a finger or a pen, the transparent electrodes touch with each other, making it possible to detect an indicated position on the transparent tablet 2-2. A film 2-3 displays fixed keys and is inserted between the liquid crystal displaying section 2-1 and the transparent tablet 2-2. The fixed keys are printed on the film so that the functions which are frequently used can be assigned to the fixed keys as fixed buttons.

Figure 3:
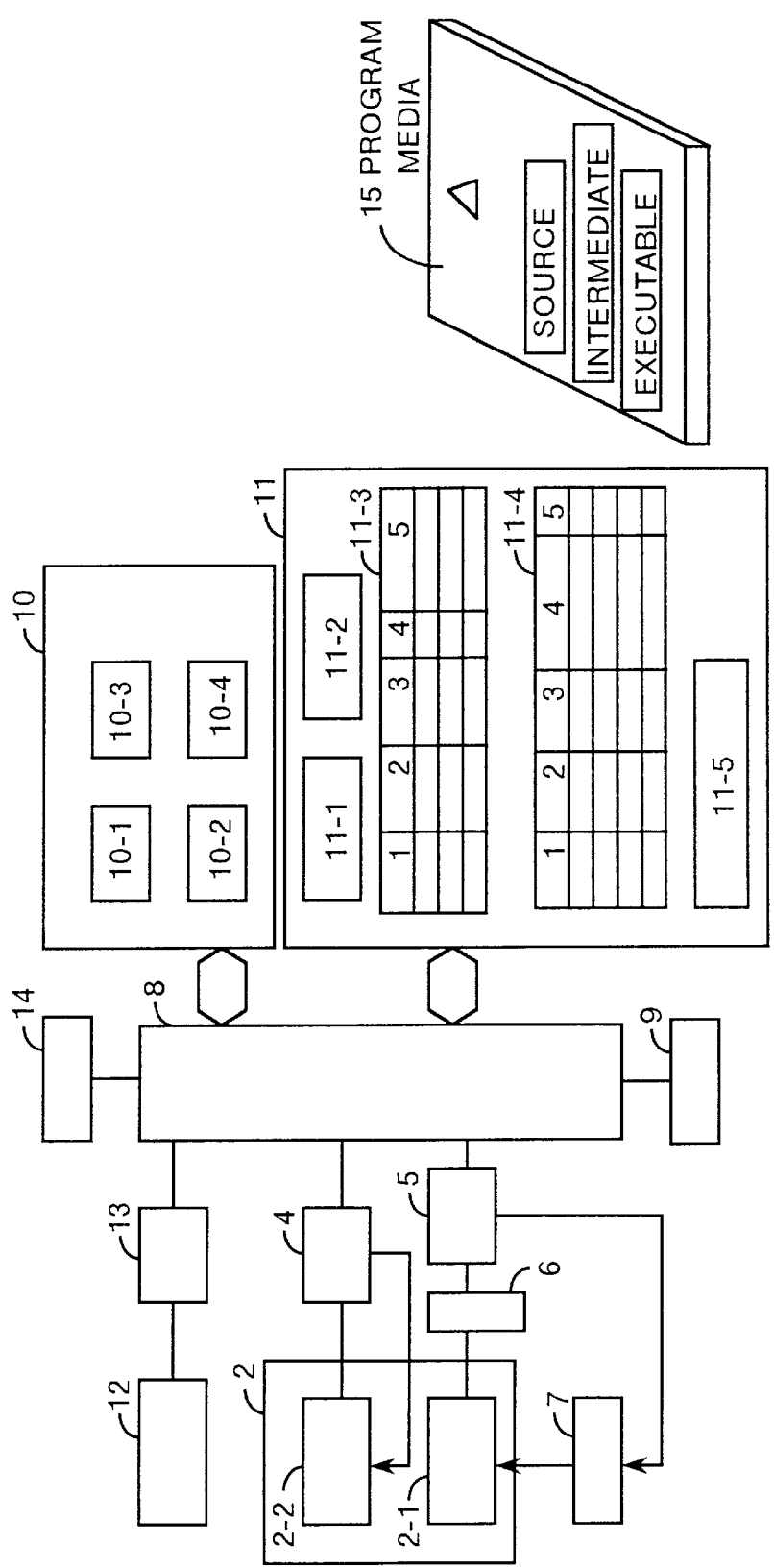
FIG. 3 is a block diagram showing a construction of the embodiment according to the present invention.

FIG. 3 is a block diagram of an apparatus according to an embodiment of the present invention. The liquid crystal displaying section 2-1 and the transparent tablet 2-2 constitute the input/output section 2, as explained with reference to FIG. 2. A tablet control section 4 is provided for taking out coordinate data from the transparent tablet 2-2 and is connected to the transparent tablet 2-2 through the transparent electrode disposed on each of the transparent sheet so that the coordinates of the position indicated with a finger or a pen may be detected by a touch contact of the two transparent electrodes. A liquid crystal display circuit section 5 stores, as a bit map, a dot position at which a liquid crystal is actuated, and sends signals to a common circuit 6 and a segment circuit 7 in accordance with the needs. A central control section 8 controls input data or output data through various instructions. An RTC (Real Time Clock) 9 is provided for counting time by means of clock signals (not shown) and outputting the present year, month, day, and time.

A ROM 10 includes a font data area 10-1 for storing fonts of characters to be displayed on the liquid crystal displaying section 2-1, a program area 10-2 for storing a program that shows an operation of the central control section 8, a dictionary area 10-3 for storing a dictionary for character conversion, and a coordinate data area 10-4 for storing conversion data which are used in converting the coordinates detected by the tablet control section 4 into the coordinates corresponding to the display position.

A RAM 11 includes a data storage section 11-1 for storing various data such as texts and figures inputted from the input/output section 2 by the user, a program storage section 11-2 for holding a program when the program is read by mounting a program medium 15 to the cabinet 1 of the main body, a received mail storing section 11-3 for storing data of received mails, a Todo task list storing section 11-4 for storing the contents of the Todo task list, and a retransmission setting memory table 11-5.

The received mail storing section 11-3 holds a received mail title 11-3-1, a sender's address 11-3-2, a receiver's address 11-3-3, a receiving date 11-3-4, and a received mail content 11-3-5. The Todo task list storing section 11-4 holds a Todo task title 11-4-1, a scheduled date of finishing the task 11-4-2, a processing date 11-4-3, a Todo task content 11-4-4, and a task finish flag 11-4-5 indicating that the task is finished.

The retransmission setting memory table 11-5 holds an address 11-5-1 indicating a destination of an electronic mail, a title (transmission date and time) 11-5-2 indicating the title of the electronic mail and the date and time of transmission, a reply due date 11-5-3 storing the set reply due date, a retransmission time interval 11-5-4 storing the time interval of retransmission by days, and a retransmission condition flag 11-5-6 indicating whether a prompting mail is to be retransmitted. The initial value of the retransmission condition flag is "1".

A modular section 12 is connected to a communication line for transmitting and receiving electronic mails therethrough and inputting and outputting data on an Internet or the like via a modular control section 13. A power supply switch 14 of the main body is a switch for turning the power supply to the main body on and off.

The program medium 15 is a data recording medium capable of being constituted separately with the main body. Examples of suitable recording media include a CD-ROM, a floppy disk, and an IC card. An executable program which is executed by being read into the main body, a source program capable of constructing the executable program, and an intermediate program are stored in the program medium 15.

Various programs and data required for performing the functions of the present invention are read from the program medium 15 by an external storage device using a program reading means (not shown). The data are stored into the data storage section 11-1 of the RAM 11, and the executable programs are stored into the program storage section 11-2 of the RAM 11.

Next, a first embodiment of the present invention is explained. FIG. 5 is a screen for transmitting electronic mails. The screen includes a connection destination input box 16 for inputting a connection destination in utilizing the personal computer communication service or the like, an address input box 17 for inputting a mail address of the receiver of the electronic mail to be transmitted, a title input box 18 for inputting a title which suggests a content of the electronic mail, a check box 19 for indicating an instruction to "Register a reply as a Todo item", and a content input box 20 for inputting the content of the electronic mail.

In order to transmit an electronic mail, the screen for electronic mail transmission shown in FIG. 5 is first displayed for inputting various data required in the respective input boxes. The data are prepared and input in each input box by means of an input device (not shown) such as a keyboard. In transmitting an ordinary electronic mail, after the data are input in each input box, a transmission button is pressed with the "Register a reply as a Todo item" check box 19 kept blank, whereby the electronic mail is transmitted to the address input in the address input box 17. The selection of displayed items and buttons may be performed by means of a pointing device such as a mouse. When a "cancel" button 22 is touched, the transmission of electronic mails is terminated and the screen for electronic mail transmission is ended.

An example of the case is given in which the mail to be transmitted needs a reply to be sent. Referring to FIG. 5, an address "abc@def.ghijk.co.jp" is input into the address input box 17; a title "Conference to be held on April 2 about planning" is input into the title input box 18; a content "Please reply to us whether you will attend the conference to be held on April 2 about planning" is input into the content input box 20; and then the "Register a reply as a Todo item" check box 19 is touched.

When the check box 19 is touched, a check mark is displayed in the check box 19, whereby the display of the input/output section 2 is turned into a screen for setting the reply due date as shown in FIG. 6. The screen for setting the reply due date shown in FIG. 6 displays a calendar 23 for designating a replay due date, and a year-month-day 24 of the reply due date for displaying the designated reply due date.

The calendar 23 displays two months: i.e. the month including the present day and the following month. When a "previous month" button 25 is touched, the screen goes back by one month to display a calendar of February and March. When a "next month" button 26 is touched, the screen goes forward by one month to display a calendar of April and May. When a cancel button 28 is touched, the operation of setting the reply due date is terminated and the screen for setting the reply due date of FIG. 6 is ended, thereby returning to the screen for transmitting electronic mails as shown in FIG. 5.

With reference to an example of display screen shown in FIG. 6, the day of March 26 is enclosed by a frame as the present day, and the days falling prior to the 26th are displayed as a setting prohibition area because the days falling prior to the 26th cannot be set as a due date for reply.

When the user touches the day of April 1 on the calendar 23 as a reply due date, the touched date is displayed in reverse, and the year-month-day 24 of the reply due date displays "Reply due date: Apr. 1, 1997."

At this time, when the "transmission" button 27 is touched, the name of the mail is stored into the Todo task title 11-4-1 on a storage area of the storing section 11-4 in the RAM 11 shown in FIG. 3; the inputted reply due date (Apr. 1, 1997) is stored into the scheduled date of finishing the task 11-4-2 in the Todo task list; the transmission destination address is stored into the Todo task content 11-4-4; and the mail is transmitted.

After the mail is transmitted, when a list of unprocessed tasks in the Todo task list is displayed, a list of transmitted mails which need a reply to be sent are displayed as unprocessed Todo data together with an ordinary list of unprocessed Todo tasks as shown in FIG. 7. In this case, since the reply due date has been set to be "Apr. 1, 1997" on the previous reply-due-date setting screen of FIG. 6, "1997/04/01" is displayed in a box 30 for the scheduled day of finishing the task, and "Conference to be held on April 2 about planning", i.e. the title of the transmitted mail, is displayed in a box 31 for the title of the Todo task.

If a reply from the receiver of the electronic mail has been sent, the task finish flag 11-4-5 in the Todo task list storage section 11-4 of the RAM 11 is set to be "1", whereby the item is displayed as a processed Todo task with a check mark added to the check box 32 when the list of Todo tasks is displayed, as shown in FIG. 8.

In displaying the Todo task list, the task finish flag 11-4-5 of the RAM 11 is examined. If the task finish flag 11-4-5 is "0", the item is displayed as an unprocessed task in the list, whereas if the task finish flag 11-4-5 is "1", the item is displayed as a processed task with a check mark added to the check box 32 in the list. Here, for inputting the reply due date, it is possible to adopt s system in which a box for inputting the year-month-day is superposed on the screen for transmission of electronic mails, whereby a numerical value is directly inputted.

Figure 9A:
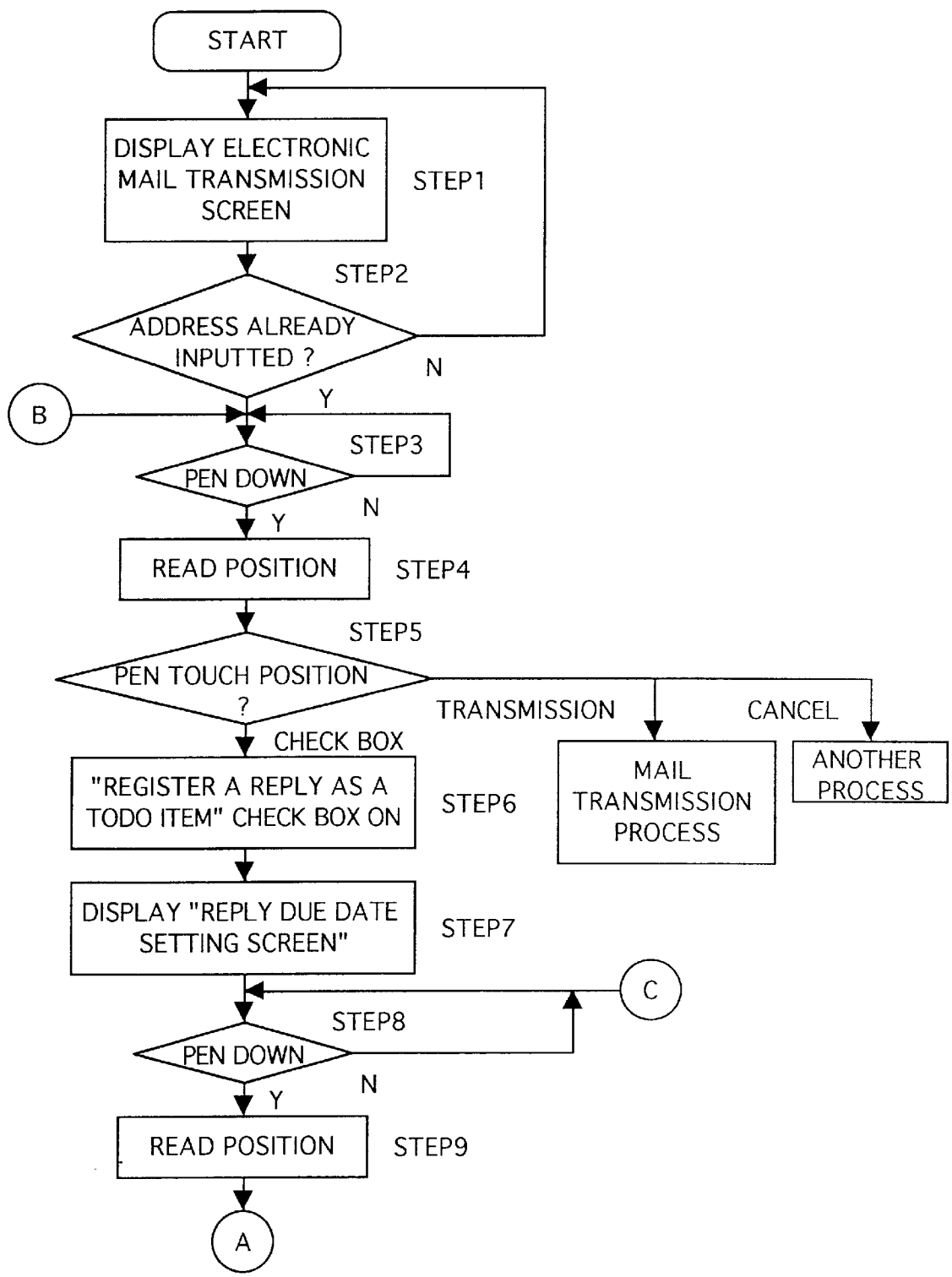
FIGS. 9(a), (b) is a flow chart showing a process of registering Todo items and transmitting electronic mails according to the present invention.

The flow of these processing steps is now explained with reference to the flowchart shown in FIGS. 9(a), (b) and 10. FIGS. 9(a), (b) is a flow chart showing a process of registering Todo items and transmitting electronic mails. In STEP (hereafter referred to simply as "S") 1, the screen for transmission of electronic mails shown in FIG. 5 is displayed. In S2, whether data have been inputted in the address input box 17 is determined and, if not, the process waits until the address is inputted. In S3, the process waits until the input/output section 2 is touched with the input pen. In S4, the pen touch position at which the input pen has touched the input/output section 2 is read.

In S5, the CPU determines where the pen touch position is located. If the pen touch position is located at the "transmission" button 21 of FIG. 5, the process of transmitting the electronic mail to the inputted address is performed. On the other hand, if the pen touch position is located at the "cancel" button 22 of FIG. 5, another process is performed.

If the pen touch position is at the "Register a reply as a Todo item" check box 19 of FIG. 5, the check box 19 is turned ON by displaying a check mark in the "Register a reply as a Todo item" check box 19 in S6.

In S7, the reply-due-date setting screen of FIG. 6 is displayed in the input/output section 2 and, in S8, the process waits until the screen is touched with the pen. In S9, the pen touch position is read to determine where the pen touch position is located in S10. If the pen touch position is located at a date falling after the present date within the calendar of FIG. 6, the date corresponding to the touched date is set in the year-month-day 24 of the reply due date in S11.

If the pen touch position is at the "previous month" button 25 of FIG. 6, the screen goes back by one month to display a calendar of the previous month in S12. If the pen touch position is at the "next month" button 26 of FIG. 6, the screen goes forward by one month to display a calendar of the next month in S13. If the pen touch position is at the "automatic retransmission setting" button 29, the process of setting the automatic retransmission is performed. This process will be explained later. If the pen touch position is at the "cancel" button 28, the display goes back to the screen for transmitting electronic mails shown in FIG. 5.

If the pen touch position is at the "transmission" button 27, whether a due date of reply has been inputted in the year-month-day 24 of the reply due date is determined in S14. If it is determined that the due date of reply has not been inputted in the year-month-day 24 of the reply due date, the process returns to S8. On the other hand, if the due date of reply has been inputted, the item is registered in the Todo task list storage section 11-4 of the RAM 11 in S15, and the inputted due date of reply is set in the scheduled date of finishing the task 11-4-2 of the Todo task list storage section 11-4 in S16, and the process of transmitting the electronic mail is carried out in S17.

Figure 10:
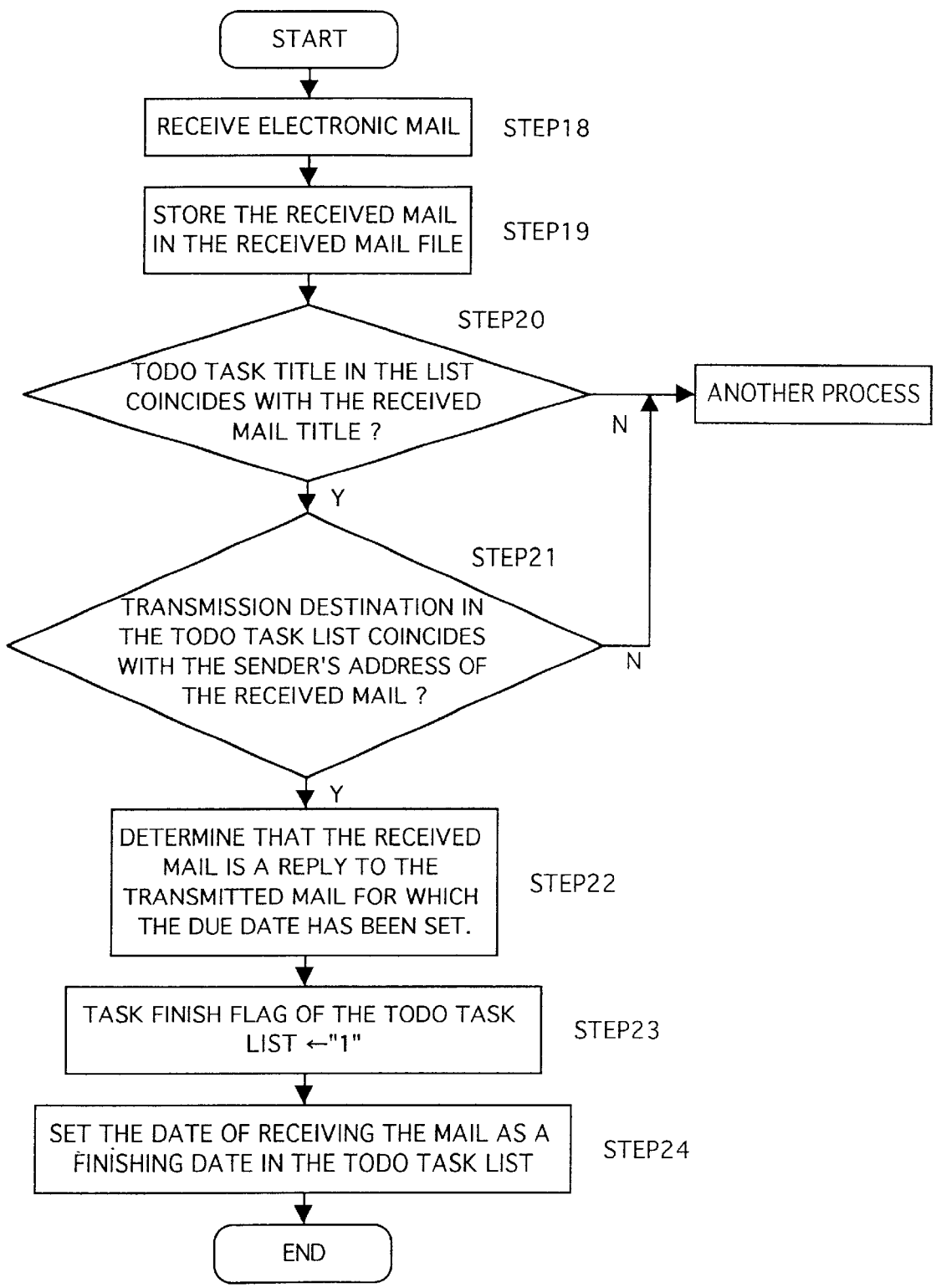
FIG. 10 is a flow chart showing a process of receiving replies for the Todo items.

FIG. 10 is a flow chart showing a process of receiving replies for the Todo items. First, an electronic mail is received in S18, and the received mail is stored into the received mail storage section 11-3 of the RAM 11 in S19. In S20, whether the Todo task title 11-4-1 in the Todo task list storage section 11-4 of the RAM 11 coincides with the received mail title 11-3-1 in the received mail storage section 11-3 or not is determined. If they do not coincide with each other, another process is performed.

If the transmission destination in the Todo task list storage section 11-4 of the RAM 11 coincides with the sender's address 11-3-2 in the received mail storage section 11-3, it is determined in S22 that the received mail is a reply to the transmitted mail for which the due date has been set, whereby "1" is stored in the task finish flag 11-4-5 of the Todo task list storage section 11-4 of the RAM 11 in S23. In S24, the date of receiving the reply mail is stored into the processing day 11-4-3 of the Todo task list storage section 11-4 of the RAM 11. Through the above process, the user can confirm the present circumstances regarding the electronic mails having a reply request and a due date simply by examining the Todo task list.

Instead of the steps S20 and S21, determination of the receipt of a reply mail may be alternatively carried out, for example, by a process in which a Message-ID is created and transmitted simultaneously at the time of transmitting an electronic mail having a request of reply, and the Message-ID is identified by making a reference to an In-Reply-To field at the time of receiving the reply mail.

A second embodiment of the present invention is hereafter explained. At the time of transmitting an electronic mail which needs a reply to be sent, an address "abc@def.ghijk.co.jp" is input into the address input box 17; a title "Conference to be held on April 2 about planning" is input into the title input box 18; a content "Please reply to us whether you will attend the conference to be held on April 2 about planning" is input into the content input box 20; and then the "Register a reply as a Todo item" check box 19 is touched, as shown in FIG. 5.

When the check box 19 is touched, a check mark is displayed in the check box 19, whereby the display of the input/output section 2 is turned into a screen for setting the reply due date as shown in FIG. 6.

When the user touches "April 1" on the calendar 23, the reply due date is set to be Apr. 1, 1997 and, when the user touches the automatic retransmission setting button 29, the automatic retransmission setting screen of FIG. 11 is displayed on the input/output section 2.

FIG. 11 shows a case for making a setting in which, when an electronic mail which needs a reply to be sent is transmitted but no reply has been received, the same electronic mail is retransmitted automatically.

The automatic retransmission setting box 33 includes two radio buttons of "YES" and "NO". If a retransmission is to be carried out, the portion "YES" is selected by touching it with an input pen. If the retransmission is not to be carried out, the portion "NO" is selected. The due date 34 displays the reply due date set by means of the reply due date setting screen shown in FIG. 6.

The retransmission time interval setting box 35 is used for setting the time interval (in days) by which retransmission is to be made in the case where "YES" is selected in the automatic retransmission setting box 33. By touching an arrow in the retransmission time interval input box 36, the retransmission time interval input box 36 turns into a list box as shown in FIG. 12, whereby an arbitrary number is selected to set the retransmission time interval. In this example, the number "3" is selected from the list box of the retransmission time interval input box 36, and the retransmission time interval setting box 35 displays that "Retransmission will be carried out every 3 days." Alternatively, the retransmission time interval may be set by directly inputting a number into the box.

The check box 37 of "The latest prompting mail will be sent when connection is made" is used for making a selection in the case where the user is not always in connection with the mail server and the prompting mails are prepared off-line. If a plurality of prompting mails to one address exist for one electronic mail to be transmitted, a selection is made as to whether only the latest prompting mail is to be retransmitted by deleting the other prompting mails or all the prompting mails are to be retransmitted when connection is made.

In this example, the check box 37 is touched to allow the check mark to be displayed, whereby the setting is made for retransmitting the latest prompting mail when connection is made.

When the "set" button 38 is touched on the automatic retransmission setting screen of FIG. 11, the address, the title, and the reply due date inputted by means of the screens in FIGS. 5 and 6 are respectively set in the address 11-5-1, the title 11-5-2, and the reply due date 11-5-3 of the retransmission setting memory table 11-5 of the RAM 11. Also, the retransmission time interval inputted as shown in FIG. 11 is set in the retransmission time interval 11-5-4. If "NO" has been selected in the automatic retransmission setting box 33, "null" is set in the retransmission time interval 11-5-4.

The retransmission condition flag 11-5-5 stores "1" when a check mark is attached to the check box 37 of "The latest prompting mail will be sent when connection is made", and stores "0" at ordinary times. The number of prompting times 11-5-6 stores the number of times by which the transmission has been actually made. The initial value for the number of prompting times 11-5-6 is "1".

When the "cancel" button 39 is touched in FIG. 11, the setting made so far in FIG. 11 is nullified, and the display returns to the reply due date setting screen of FIG. 6. In the automatic retransmission setting button 29 of FIG. 6, the presence/absence of the setting may be confirmed by, for example, displaying the letters "automatic retransmission setting" of the button in gray when the automatic retransmission setting has not been made, and displaying them in black when the automatic retransmission setting has been made.

With reference to FIGS. 5, 6, and 11, an explanation of retransmission process is explained on a case where a setting has been made such that an electronic mail which needs a reply to be sent by Apr. 1, 1997 will be transmitted on March 26 and, if no replies are received, the prompting mails are automatically retransmitted every 3 days.

For example, if the user does not make a connection with the mail server until April 1 and the check mark is not attached to the check box 37 of "The latest prompting mail will be sent when connection is made", two prompting electronic mails having the same content are transmitted to the same address when the user makes a connection with the mail server on April 1. If the check mark is attached to the check box 37 of "The latest prompting mail will be sent when connection is made", only one prompting mail is transmitted when the user makes a connection with the mail server on April 1. Preparation of these prompting mails are carried out irrespective of whether the power of the apparatus is ON or Off or whether the communication connection is made or not.

Figure 13A:
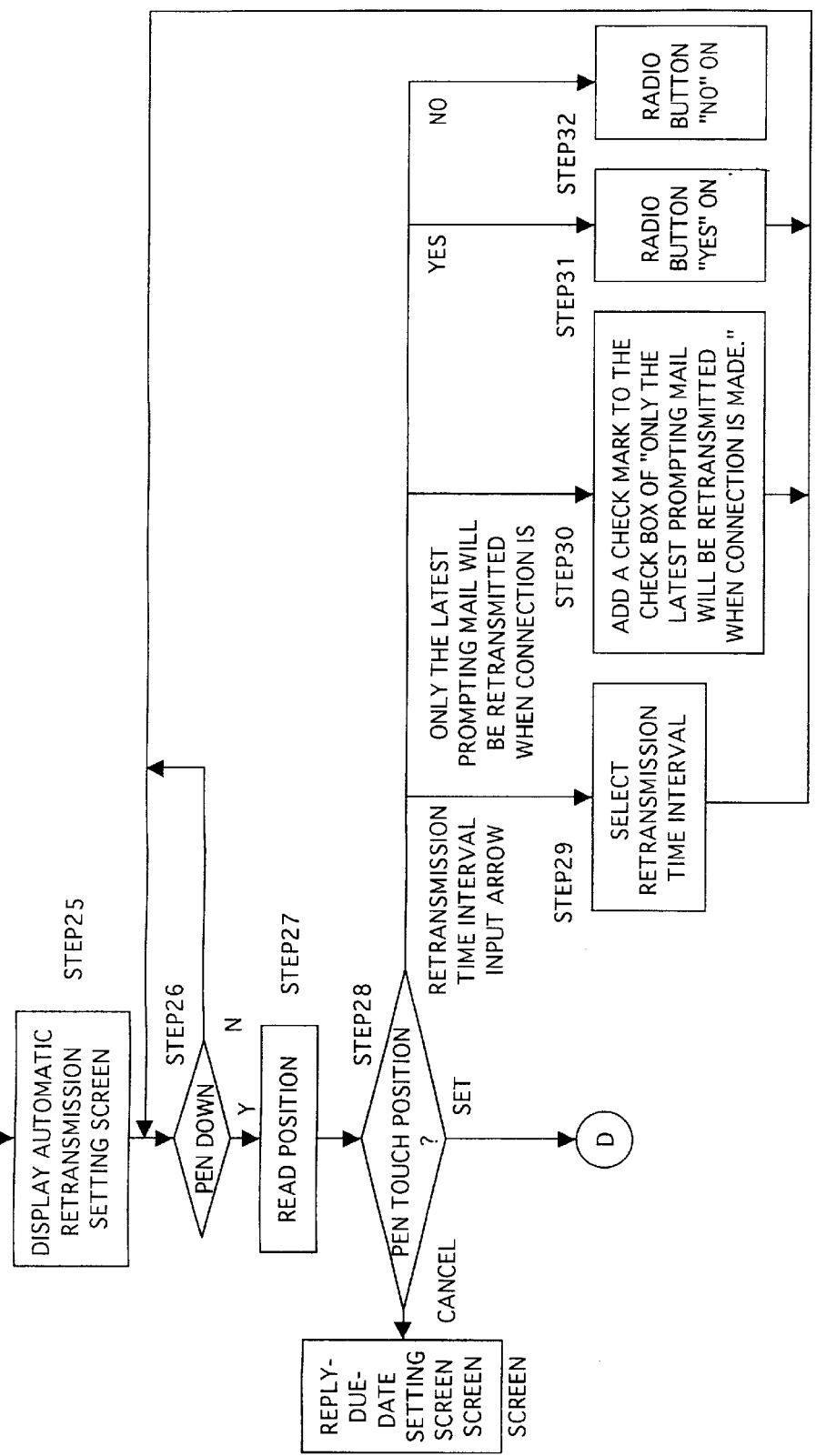
FIGS. 13(a), (b) is a flow chart showing a process of automatic retransmission setting according to the present invention.
Figure 13B:
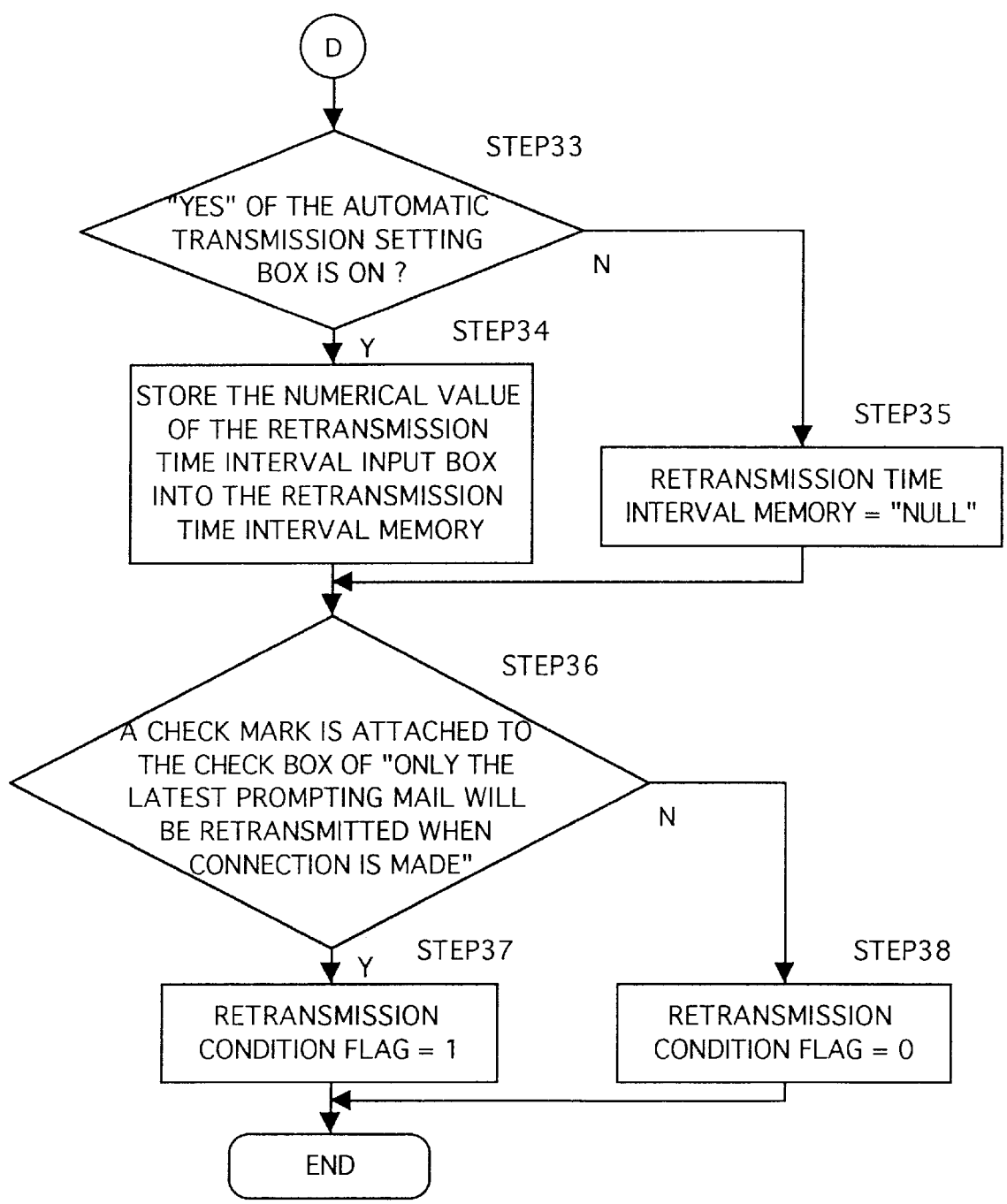

The above-mentioned operation is now explained with reference to the flow charts in FIGS. 13(a), (b) and 14(a), (b). FIG. 13(a), (b) is a flow chart showing a process of automatic retransmission setting. First, in S25 the automatic retransmission setting screen of FIG. 11 is displayed, and in S26 the process waits until the input/output section 2 is touched with an input pen.

When the input pen touches the input/output section 2, the touched position is read in S27, and the CPU determines where the pen touch position is located in S28. When it is determined that the input pen touches the "cancel" button 39, the display returns to the reply-due-date setting screen of FIG. 6. If it is determined that the input pen touches the arrow of the retransmission time interval input box, the list box is displayed in the step S29 for selecting the time interval for retransmission. If it is determined that the input pen touches the check box 37 of "The latest prompting mail will be sent when connection is made", a check mark is attached to the check box 37 in S30.

If it is determined that the input pen touches "YES" of the automatic retransmission setting box 33, the radio button of "YES" is turned ON in S31, while if it is determined that the input pen touches "NO" of the automatic retransmission setting box 33, the radio button of "NO" is turned ON in S32.

In S33, whether "YES" of the automatic retransmission setting box 33 is ON or not is determined. If "YES" of the automatic retransmission setting box 33 is ON, the numerical value of the retransmission time interval input box 36 is set into the retransmission time interval 11-5-4 of the retransmission setting memory table 11-5 of the RAM 11 in S34. If "NO" of the automatic retransmission setting box 33 is ON, "null" is set into the retransmission time interval 11-5-4 of the retransmission setting memory table 11-5 of the RAM 11 in S35.

In S36, whether a check mark has been attached to the check box 37 of "The latest prompting mail will be sent when connection is made" is determined. If it is determined that a check mark has been attached to the check box 37 of "The latest prompting mail will be sent when connection is made", "1" is set into the retransmission condition flag 11-5-5 or the retransmission setting memory table 11-5 of the RAM 11 in S37, and the process is ended. If it is determined that a check mark has not been attached to the check box 37 of "The latest prompting mail will be sent when connection is made", "0" is set into the retransmission condition flag 11-5-5 of the retransmission setting memory table 11-5 of the RAM 11 in S38, and the process is ended.

Figure 14A:
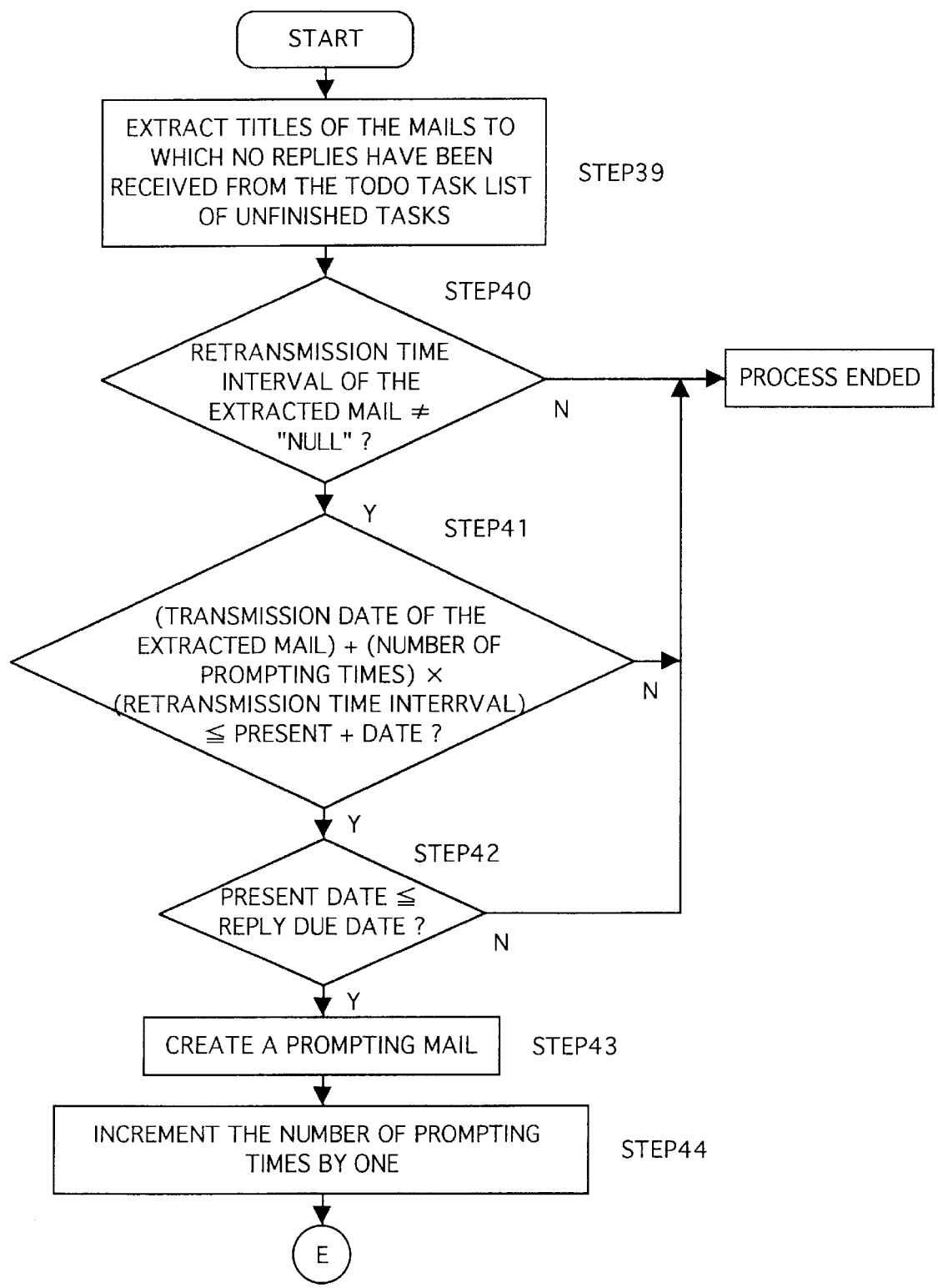
FIGS. 14(a), (b) is a flow chart showing a process of transmitting prompting mails according to the present invention.
Figure 14B:
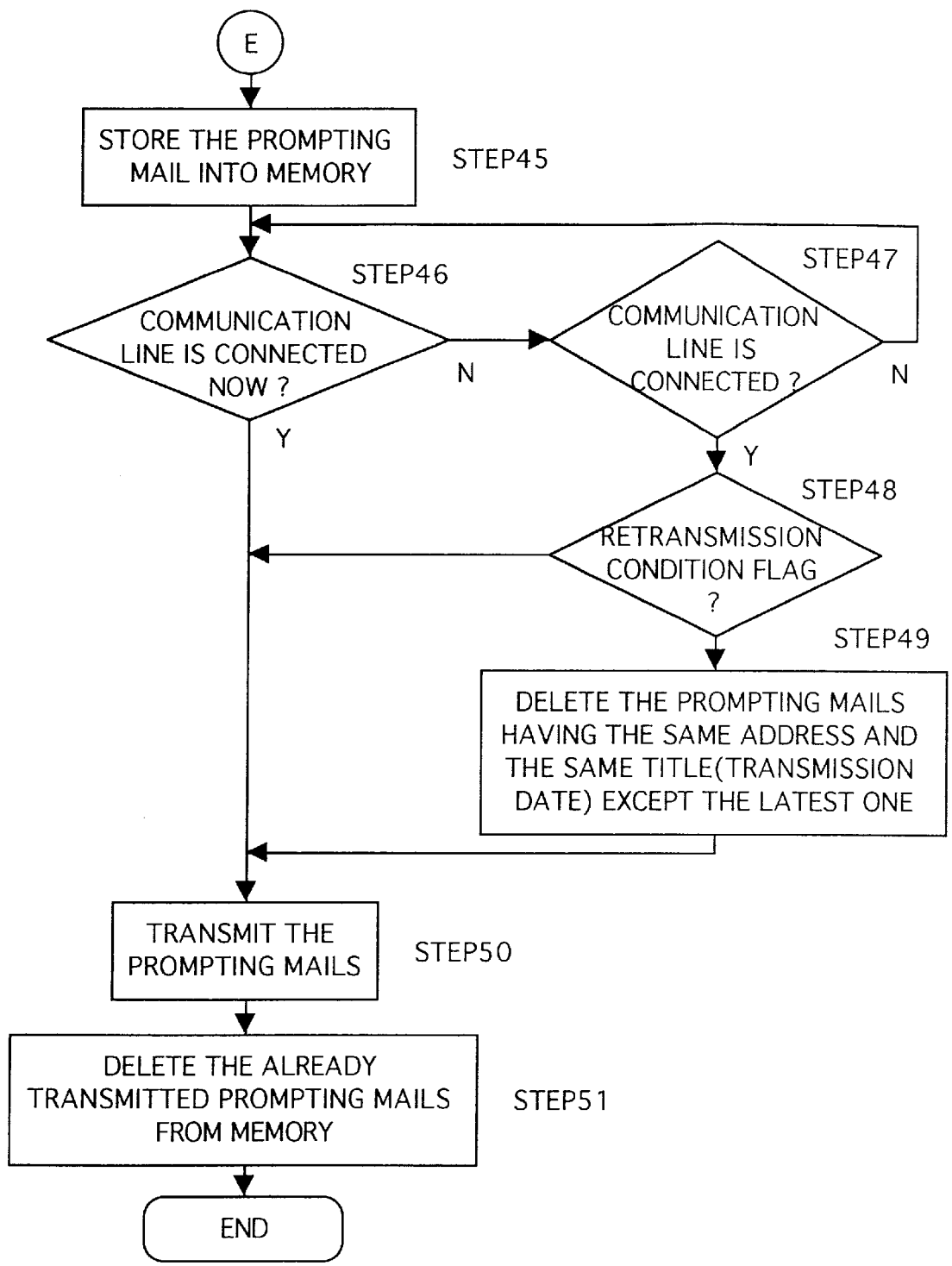

FIGS. 14(a), (b) is a flow chart showing a process of transmitting prompting mails. First, in S39, only the items having a value of "0" in the task finish flag 11-4-5 of the Todo task list storing section 11-4 of the RAM 11 are extracted, and the titles of the mails to which no replies have been received are extracted from the Todo task list of unfinished tasks by determining whether or not a mail address is present in the address 11-5-1 of the retransmission setting memory table 11-5.

In S40, whether the retransmission time interval 11-5-4 of the mail extracted in S39 in the retransmission setting memory table 11-5 is "null" or not is determined. If the retransmission time interval 11-5-4 of the extracted mail in the retransmission setting memory table 11-5 is "null", the process is ended. If it is not "null", a product of the number of prompting times 11-5-6 and the retransmission time interval 11-5-4 is added to the transmission date 11-5-2 of the electronic mail in the retransmission setting memory table 11-5 in S41, and by determining whether the date obtained by the above calculation falls prior to the present date or not, the CPU determines whether the prompting mail should be retransmitted at the present date or not. If it is determined in S41 that the prompting mail need not be retransmitted at the present date, the process is ended.

When the product of the number of prompting times 11-5-6 and the retransmission time interval 11-5-4 is added to the transmission date 11-5-2 of the electronic mail in the retransmission setting memory table 11-5 and the date obtained by the above calculation falls prior to the present date and, therefore, the prompting mail should be retransmitted at the present date, then the CPU determines in S42 whether the present date falls prior to the reply due date 11-5-3 of the electronic mail or not.

If the present date falls after the reply due date 11-5-3 of the electronic mail, the process is ended. If the present date falls prior to the reply due date 11-5-3 of the electronic mail, a prompting mail is created in S43 based on information of the electronic mail in the retransmission setting memory table 11-5 of the RAM 11, and the number of prompting times 11-5-6 of the electronic mail in the retransmission setting memory table 11-5 is incremented by one in S44.

In S45, the prompting mail created in S44 is stored into the data storage section 11-1 of the RAM 11 shown in FIG. 3. In the next step S46, whether the communication line is connected now or not is determined.

If the communication line is connected now, the process proceeds to S50. If the communication line is not connected now, the connection status of the communication line is monitored in S47. If it is confirmed in S47 that the communication line is connected, the process proceeds to S48.

If it cannot be confirmed that the communication line is connected, the process returns to S46 and the steps S46 to S47 are repeated for waiting until the connection is confirmed. In S48, the value of the retransmission condition flag 11-5-5 of the electronic mail in the retransmission setting memory table 11-5 of the RAM 11 is examined.

If the retransmission condition flag 11-5-5 of the electronic mail is "0", the process proceeds to S50. If the retransmission condition flag is "1" and if a plurality of prompting mails having the same address and the same title (transmission date) are present, the prompting mails are deleted except the latest one in S49. In the next step S50, the prompting mails stored in S45 are transmitted, and in S51 the prompting mails which have already been transmitted are deleted from the RAM data storage section 11-1. Through the above steps, it is possible to achieve a process for transmitting only the latest prompting mail if the connection with the mail server is not maintained at all times and if the connection with the mail server is not made for a longer period of time than the transmission time interval of the prompting mails.

According to the present invention, the situation of electronic mails which need a reply to be sent by a due date can be confirmed only by examining the memorandum record (Todo task list), without requiring a particular system on the mail server side, through registering the transmission of an electronic mail as an unprocessed item in the Todo task list. If the replies have not been sent, the prompting mails are automatically retransmitted to prompt a reply. This solves a problem that the user forgets to transmit the prompting mails.

Also, when a reply mail is received, a check mark is attached to the check box of the corresponding unprocessed item in the Todo task list, indicating that the task is finished, and the date of receiving the reply mail is registered as a processing date, whereby management of the processing date can be carried out together with the other Todo items.

Also, if the connection with the mail server is not maintained at all times and if the connection with the mail server is not made for a longer period of time than the transmission time interval of the prompting mails, only the latest prompting mail is transmitted, thereby reducing the period of time for connection and preventing the inconvenience of unnecessarily transmitting a plurality of prompting mails.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. An electronic mail processing apparatus comprising:
   a ToDo task list inputting device for controlling a schedule of a user;
   a ToDo task list storing device;
   a ToDo task list controlling device;
   a ToDo task list displaying device for displaying a list of unprocessed ToDo tasks and a list of processed ToDo tasks;
   a transmitting device for transmitting electronic mails;
   a receiving device for receiving electronic mails;
   a selecter for selecting whether a request for reply to an electronic mail to be transmitted is to be made or not;
   an inputting device for inputting a due date of reply when a selection has been made by the selecter to make the request for reply;
   a registerer for automatically registering, in the ToDo task list storing device, predetermined information including information on presence/absence of a reply to the transmitted mail, the due date of the reply, a title, an address, and a date and time of transmission of the transmitted mail;
   a displaying device for displaying at least the information on the presence/absence of the reply and the due date of the reply for each transmitted mail; and
   a reply determiner for determining whether or not a first electronic mail received by the receiving device is a reply to a second electronic mail transmitted by the transmitting device by verifying whether a title and a sender's address of the first electronic mail coincide with a title and an address of the second mail, respectively, which have been registered in the memory;
   wherein the ToDo task list displaying device displays at least the due date of the reply and the title among the registered information as one of the unprocessed ToDo task lists, and the registerer registers a presence of a reply as the information on presence/absence of the reply when the reply determiner determines that the first electronic mail is a reply to the second electronic mail, and the ToDo task list displaying device displays at least a received date and a title of the reply mail as one of the unprocessed ToDo task lists.

2. An electronic mail processing apparatus comprising:

a transmitting device for transmitting electronic mails;

a receiving device for receiving electronic mails;

a selecter for selecting whether a request for reply to an electronic mail to be transmitted is to be made or not;

an inputting device for inputting a due date of reply when a selection has been made by the selecter to make the request for reply;

a registerer for automatically registering, in a memory, predetermined information including information on presence/absence of a reply to the transmitted mail, the due date of reply, a title, an address, and a date and time of transmission of the transmitted mail;

a displaying device for displaying at least the information on the presence/absence of the reply and the due date of reply for each transmitted mail; and prompting mail setter for setting a time interval of transmitting prompting mails for prompting the reply;

prompting determiner for determining whether the prompting mails should be transmitted or not; and prompting mail preparer for preparing the prompting mails if determined that the prompting mails should be transmitted, wherein the prompting determiner determines that only the latest prompting mail from a plurality of similar prompting mails should be transmitted if the present date is prior to the due date of reply, if the set time interval of transmission has passed from the date on which the electronic mail is transmitted and if a reply to the electronic mail has not yet been received, and further wherein the transmitting device transmits only the latest prompting mail and deletes all other similar prompting mails that have been prepared since a previous connection with an intended recipient of the latest prompting mail, thereby only sending a single prompting mail to the intended recipient upon connection therewith regardless of a time period since a last connection with the intended recipient.

3. A method for processing electronic mails in an electronic mail processing apparatus having functions of transmitting and receiving electronic mails, comprising the steps of:

using a ToDo task list in connection on with a schedule of a user;

storing the ToDo task list on a ToDo task list storing device;

providing a controller for the ToDo task list;

providing a ToDo task list displaying device for displaying a list of unprocessed ToDo tasks and a list of processed ToDo tasks;

selecting whether a request for reply to an electronic mail to be transmitted is to be made or not;

inputting a due date of reply when a selection has been made in the selecting step to make the request for reply;

automatically registering, in the ToDo task list storing device, predetermined information including information on presence/absence of the reply to the transmitted mail, the due date of reply, a title, an address, and a date and time of transmission of the transmitted mail;

displaying at least the information on presence/absence of the reply and the due date of reply for each transmitted mail; and determining whether or not a first electronic mail received is a reply to a second electronic mail transmitted by verifying whether a title and a sender's address of the first electronic mail coincide with the title and the address of the second mail, respectively, which have been registered in the memory, wherein the ToDo task list displaying device displays at least the due date of the reply and the title among the registered information as one of the unprocessed ToDo task lists; and a presence of a reply is registered as the information on presence/absence of the reply when it is determined that the first electronic mail is a reply to the second electronic mail, and wherein the ToDo task list displaying device displays at least a received date and a title of the reply mail as one of the unprocessed ToDo task lists.

4. A method for processing electronic mails in an electronic mail processing apparatus having functions of transmitting and receiving electronic mails, comprising the steps of:

selecting whether a request for reply to an electronic mail to be transmitted is to be made or not;

inputting a due date of reply when a selection has been made in the selecting step to make the request for reply;

automatically registering, in a memory, predetermined information including information on presence/absence of the reply to the transmitted mail, the due date of reply, a title, an address, and a date and time of transmission of the transmitted mail;

displaying at least the information on presence/absence of the reply and the due date of reply for each transmitted mail;

setting a time interval of transmitting prompting mails for prompting the reply;

determining whether the prompting mails should be transmitted or not on the basis of a predetermined condition;

preparing the prompting mails if it is determined that the prompting mails should be transmitted, and transmitting only the latest prompting mail from a plurality of similar prompting mails if the present date is prior to the due date of reply, if the set time interval of transmission has passed from the date on which the electronic mail is transmitted and if a reply to the electronic mail has not yet been received, and deleting all other similar prompting mails that have been prepared since a previous connection with an intended recipient of the latest prompting mail, thereby only sending a single prompting mail to the intended recipient upon connection therewith regardless of a time period since a last connection with the intended recipient.

5. A computer readable recording medium containing thereon an electronic mail processing program performing the functions of:

controlling a schedule of a user with a ToDo task list stored in a ToDo task list storing device;

displaying a list of unprocessed ToDo tasks and a list of processed ToDo tasks;

causing a computer to select whether a request for reply to an electronic mail to be transmitted is to be made or not;

causing a computer to input a due date of reply when a selection has been made in the selecting step to make the request for reply;

causing a computer to automatically register, in the ToDo task list storing device, predetermined information including information on presence/absence of the reply to the transmitted mail, the due date of reply, a title, an address, and a date and time of transmission of the transmitted mail;

causing a computer to display at least the information on presence/absence of the reply and the due date of reply for each transmitted mail;

causing a computer to determine whether or not a first electronic mail received is a reply to a second electronic mail transmitted by verifying whether a title and a sender's address of the first electronic mail coincide with the title and the address of the second mail, respectively, which are registered in the memory beforehand;

causing the computer to display at least the due date of the reply and the title among the registered information as one of the unprocessed ToDo task lists; and causing a computer to register a presence of a reply as the information on presence/absence of the reply when it is determined that the first electronic mail is a reply to the second electronic mail, and to display at least a received date and a title of the reply mail as one of the unprocessed ToDo task lists.

6. A computer readable recording medium containing thereon an electronic mail processing program performing the functions of:

causing a computer to select whether a request for reply to an electronic mail to be transmitted is to be made or not;

causing a computer to input a due date of reply when a selection has been made in the selecting step to make the request for reply;

causing a computer to automatically register, in a memory, predetermined information including information on presence/absence of the reply to the transmitted mail, the due date of reply, a title, an address, and a date and time of transmission of the transmitted mail;

causing a computer to display at least the information on presence/absence of the reply and the due date of reply for each transmitted mail;

causing a computer to set a time interval of transmitting prompting mails for prompting the reply;

causing a computer to determine whether the prompting mails should be transmitted or not on the basis of a predetermined condition;

causing a computer to prepare the prompting mails if it is determined that the prompting mails should be transmitted; and causing a computer to transmit only the latest prompting mail from a plurality of similar prompting mails if the present date is prior to the due date of reply, if the set time interval of transmission has passed from the date on which the electronic mail is transmitted and if a reply to the electronic mail has not yet been received, and to delete all other similar prompting mails that have been prepared since a previous connection with an intended recipient of the latest prompting mail, thereby only sending a single prompting mail to the intended recipient upon connection therewith regardless of a time period since a last connection with the intended recipient.

* * * * *